J. Harden.
Anti-Friction Bearing for Machinery.
N° 73245          Patented Jan. 14, 1868.
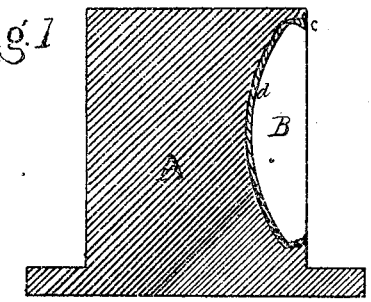
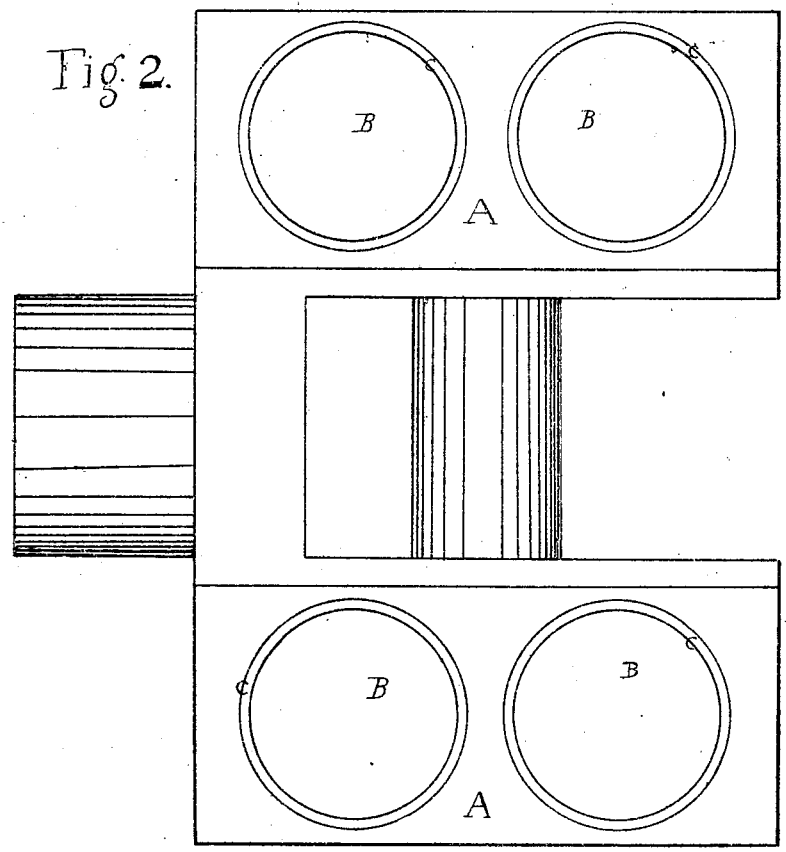
Witnesses
G. L. Chapin,
A. Hayward
Inventor:
John Harden

United States Patent Office.

JOHN HARDEN, OF CHICAGO, ILLINOIS.

Letters Patent No. 73,245, dated January 14, 1868.

IMPROVEMENT IN ANTI-FRICTION BEARING FOR MACHINERY.

The Schedule referred to in these Letters Patent and making part of the same.

TO ALL WHOM IT MAY CONCERN:

Be it known that I, JOHN HARDEN, of Chicago, in the county of Cook, and State of Illinois, have invented an Anti-Friction Bearing for the Working Parts of Machinery; and I do hereby declare that the following is a full, clear, and exact description of the construction and operation of the same, reference being had to the accompanying drawings, and letters marked thereon, making a part of this description, in which—

Figure 1 is a section of one of the wings of a cross-head with my invention attached.

Figure 2, a plan view of the cross-head, showing also my device.

The nature of my invention consists in making a countersink in, or cutting away so much of the slides of a common cross-head, or other working parts of machinery, as is necessary to receive glass or stone sets; and in the use of an elastic bed for the glass to rest upon, for the purpose of providing means which will allow said glass or stone to expand without protruding above the surface of the metal in which it is set, and also for preventing breakage.

I know that glass and stone have been used for years as boxings, jewels, &c., but claim that the combination of stone or glass with metal, making a compound bearing, is new, and when the former is made to rest on flexible beds is very durable, and when in use causes much less friction than when metal bearings and boxes are employed. Small boxes are now made of glass and stone, and in many fine chronometers pivots are made of the same material; but this is impracticable in the manufacture of heavy machinery. Therefore, all that can be done to gain the benefit of the anti-friction properties of glass and stone is to insert so much of it in the working parts of machinery as can be done without weakening the metal too much in which it is set.

In order to give a correct understanding of my device, I have marked corresponding parts with similar letters, and will now give a detailed description.

A A represent the wings of the common cross-head, to which my device is applied; and in order to set a series of glasses firmly in said wings, I either cast or drill, as the case may require, depressions or countersinks, of such depth and shape as will conform to the contour of the under side of the glass, B, as seen, at the sectional drawing, fig. 1. If the depressions are drilled in the bearings, the latter should be first turned and fitted up in the usual manner, after which the glass, B, should be ground off so as to conform to the plane or periphery of the surface of the working part. The glass can then set on paper, or any suitable flexible material, d, and be packed, as seen at c, with Babbit metal, or any suitable material necessary to hold it firmly in place. If the depressions are cast in the bearings, they must be finished, so as to give a permanent seat for the paper, d, and glass, B, to rest on. When glass, B, is used in combination with a bearing or boxing, it can be made convex or concave, as the case may require; by which means all of the working parts of machinery can have inserted a sufficient number of sets B to receive all of the wear without materially weakening the metal in which they are put.

Having thus fully described my device, what I claim, and desire to secure by Letters Patent, is—

The glass bearings B, in combination with the working parts of machinery A, flexible seat d, arranged as set forth, and for the purposes specified.

JOHN HARDEN.

Witnesses:
GEO. S. CHAPIN,
A. HAYWARD.